United States Patent
Shu

(10) Patent No.: US 8,587,957 B2
(45) Date of Patent: Nov. 19, 2013

(54) MOUNTING APPARATUS FOR DATA STORAGE DEVICE

(75) Inventor: Si-Wen Shu, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 211 days.

(21) Appl. No.: 13/211,274

(22) Filed: Aug. 16, 2011

(65) Prior Publication Data

US 2012/0236511 A1   Sep. 20, 2012

(30) Foreign Application Priority Data

Mar. 15, 2011   (CN) .......................... 2011 1 0063486

(51) Int. Cl.
  *H05K 7/00* (2006.01)
  *H05K 7/14* (2006.01)
  *H05K 7/16* (2006.01)

(52) U.S. Cl.
  USPC ................. 361/801; 361/679.32; 361/679.33; 361/679.39

(58) Field of Classification Search
  USPC .......... 361/679.32, 679.33, 679.39, 725, 726, 361/755, 801
  See application file for complete search history.

(56) References Cited

U.S. PATENT DOCUMENTS

| | | | | |
|---|---|---|---|---|
| 6,956,745 B2 * | 10/2005 | Kerrigan et al. | ............... | 361/726 |
| 7,248,468 B1 * | 7/2007 | Hsu | .......................... | 361/679.33 |
| 7,344,394 B1 * | 3/2008 | Barina et al. | .................. | 439/157 |
| 7,466,554 B2 * | 12/2008 | Matsumoto et al. | .......... | 361/724 |
| 7,483,268 B1 * | 1/2009 | King et al. | ............... | 361/679.38 |
| 7,492,586 B2 * | 2/2009 | Peng et al. | ............... | 361/679.33 |
| 7,701,706 B2 * | 4/2010 | Peng et al. | ............... | 361/679.37 |
| 2007/0297129 A1 * | 12/2007 | Liu et al. | ....................... | 361/685 |
| 2009/0059509 A1 * | 3/2009 | Peng et al. | .................... | 361/685 |
| 2011/0085291 A1 * | 4/2011 | Lin et al. | .................. | 361/679.33 |

* cited by examiner

*Primary Examiner* — Jacob Crum
(74) *Attorney, Agent, or Firm* — Altis & Wispro Law Group, Inc.

(57) ABSTRACT

A mounting apparatus for mounting a data storage device includes a bracket and a locking member. The bracket includes a first clamping arm and a second clamping arm pivotable relative to the first clamping arm. A number of mounting pins extend from each of the first and second clamping arms. The second clamping arm includes a first hook. The locking member is pivotably mounted to the first clamping arm and includes a second hook. When the second clamping arm is pivoted towards the first clamping arm, the first hook of the second clamping arm drives the locking member to rotate, until the second hook engages with the first hook and the mounting pins engage in opposite sidewalls of the data storage device.

11 Claims, 4 Drawing Sheets

MOUNTING APPARATUS FOR DATA STORAGE DEVICE

BACKGROUND

1. Technical Field

The present disclosure relates to an apparatus for mounting a data storage device.

2. Description of Related Art

When a computer is assembled, a bracket is mounted in a computer enclosure to attach data storage devices, often by screws. This methodology can be tedious and time-consuming. Moreover, in this process, one or more screws can easily fall into the crowded interior of the computer enclosure, thus requiring a difficult retrieval.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure, including the accompanying drawings, is illustrated by way of example and not by way of limitation. It should be noted that references to "an" or "one" embodiment in this disclosure are not necessarily to the same embodiment, and such references mean at least one.

Figure 1:
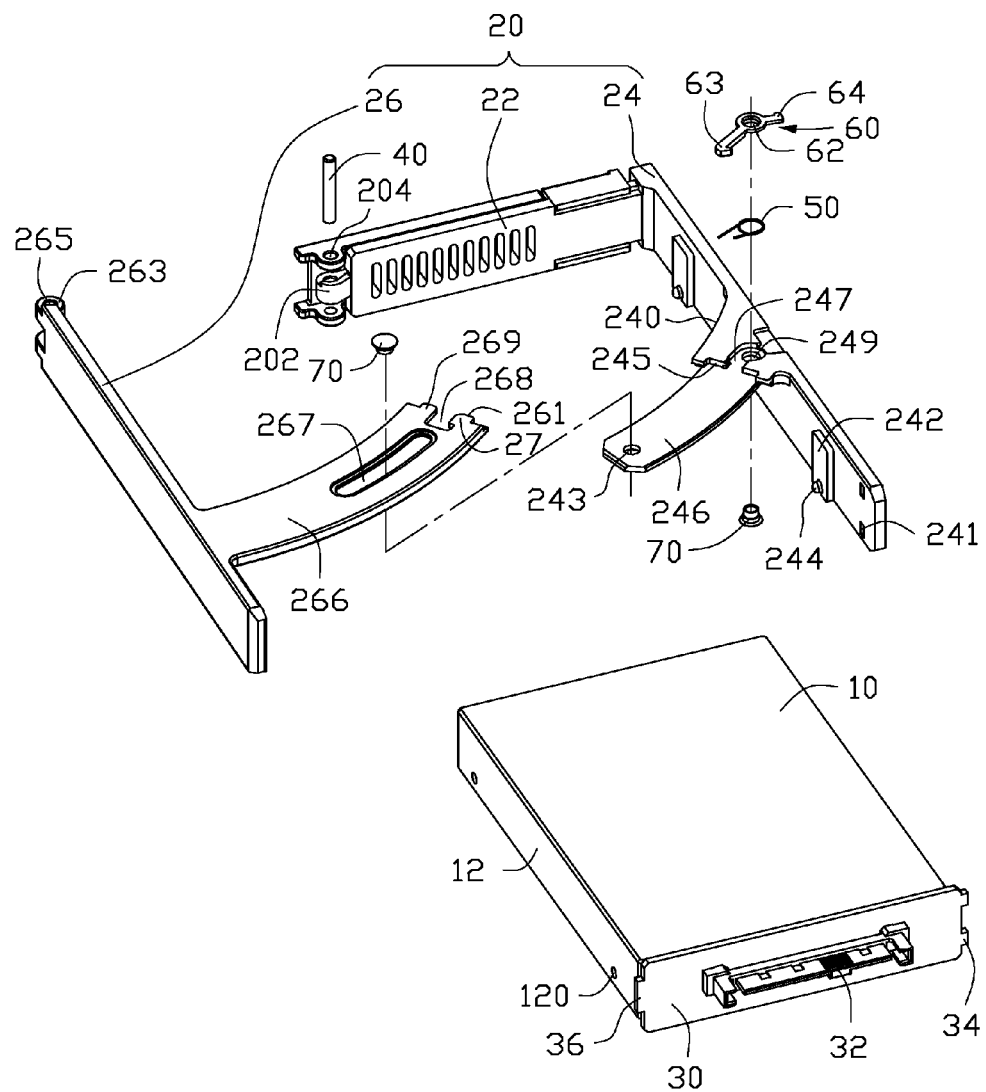
FIG. 1 is an exploded, isometric view of an exemplary embodiment of a mounting apparatus together with a data storage device.

Referring to FIG. 1, an exemplary embodiment of a mounting apparatus is provided to mount a data storage device 10, such as a hard disk drive. The mounting apparatus includes a bracket 20, a circuit board 30, a shaft 40, a torsion spring 50, a latching member 60, and two locking pins 70.

The data storage device 10 includes two opposite sidewalls 12. Each sidewall 12 defines two mounting holes 120.

The circuit board 30 is mounted to a rear end of the data storage device 10. The circuit board 30 includes a connector 32 to connect the data storage device 10 to other electronic devices (not shown), two first latches 34 extending from a first end of the circuit board 30, and a second latch 36 extending from a second end of the circuit board 30 opposite to the first end.

The bracket 20 includes a front plate 22, a first clamping arm 24 fixed to a first end of the front plate 22 in a substantially perpendicular manner, and a second clamping arm 26 pivotably mounted to a second end of the front plate 22 opposite to the first end. Three tabs 202 extend from a rear surface of the second end of the front plate 22. Each tab 202 defines a pivot hole 204.

Two first cushions 242 extend from an inner side of the first clamping arm 24, for absorbing vibrations between the data storage device 10 and the first clamping arm 24. Each first cushion 242 includes a mounting pin 244 extending in a substantially perpendicular manner from the first cushion 242. An arc-shaped latching piece 246 extends from a center of a top of the first clamping arm 24. A positioning portion 240 extends from a top of the latching piece 246, adjacent to the first clamping arm 24. The positioning portion 240 defines a receiving space 247 extending through two opposite ends of the positioning portion 240. The positioning portion 240 includes a blocking surface 245 at the end of the positioning portion 240 away from the first clamping arm 24, the blocking surface 245 at a side of the receiving space 247. The latching piece 246 defines through hole 249 in the receiving space 247, and a mounting hole 243 in an extremity of the latching piece 246 away from the first clamping arm 24. The first clamping arm 24 defines two mounting holes 241, away from the front plate 22.

Figure 2:
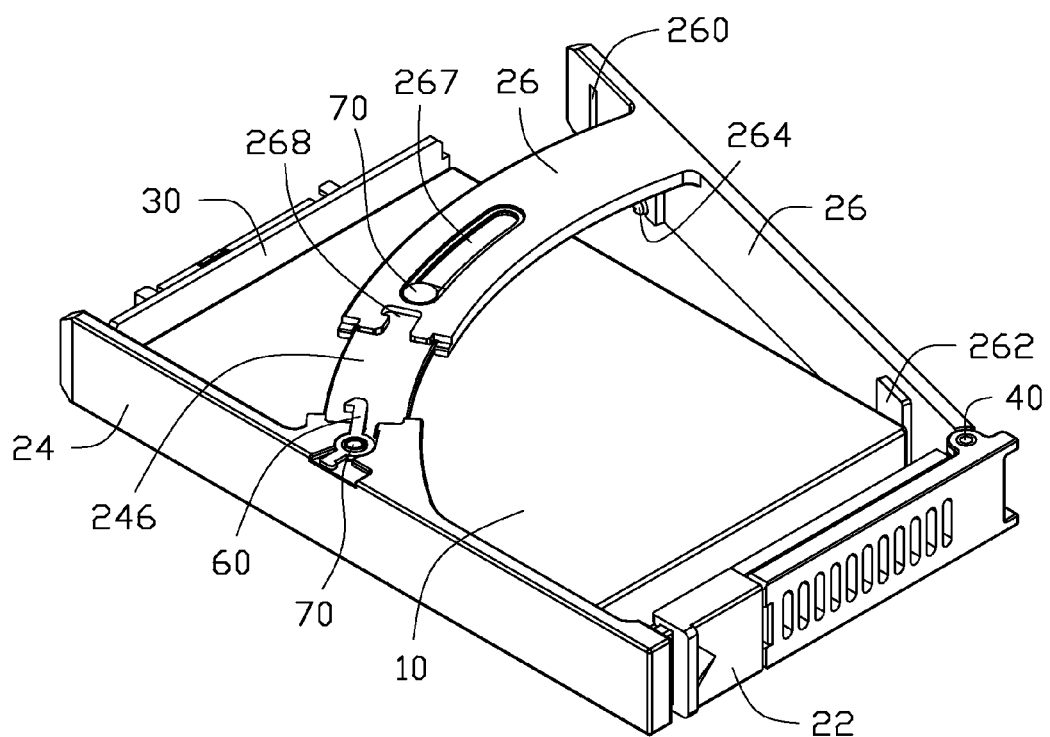
FIGS. 2 to 4 are assembled, isometric views of FIG. 1, but showing different states of use.

Referring to FIG. 2, two second cushions 262 extend from an inner side of the second clamping arm 26, for absorbing vibrations between the data storage device 10 and the second clamping arm 26. Each second cushion 262 includes a mounting pin 264 extending in a substantially perpendicular manner from the second cushion 262. Two tabs 263 extend from a first end of the second clamping arm 26. Each mounting portion 263 defines a pivot hole 265. An arc-shaped slide plate 266 extends from a center of a top of the second clamping arm 26. The slide plate 266 defines an arc-shaped slide slot 267. An extremity of the slide plate 266 opposite to the second clamping arm 26 defines a latching slot 268. An engaging block 269 and a first hook 27 extend from the extremity of the slide plate 266, at opposite sides of the latching slot 268. The first hook 27 includes a slanting surface 261 opposite to the slide slot 267. A second end of the second clamping arm 26 opposite to the first end defines a mounting hole 260.

The latching member 60 defines a pivot hole 62 in the center. A second hook 63 and a handle 64 extend from two opposite sides of the latching member 60, respectively.

Figure 3:
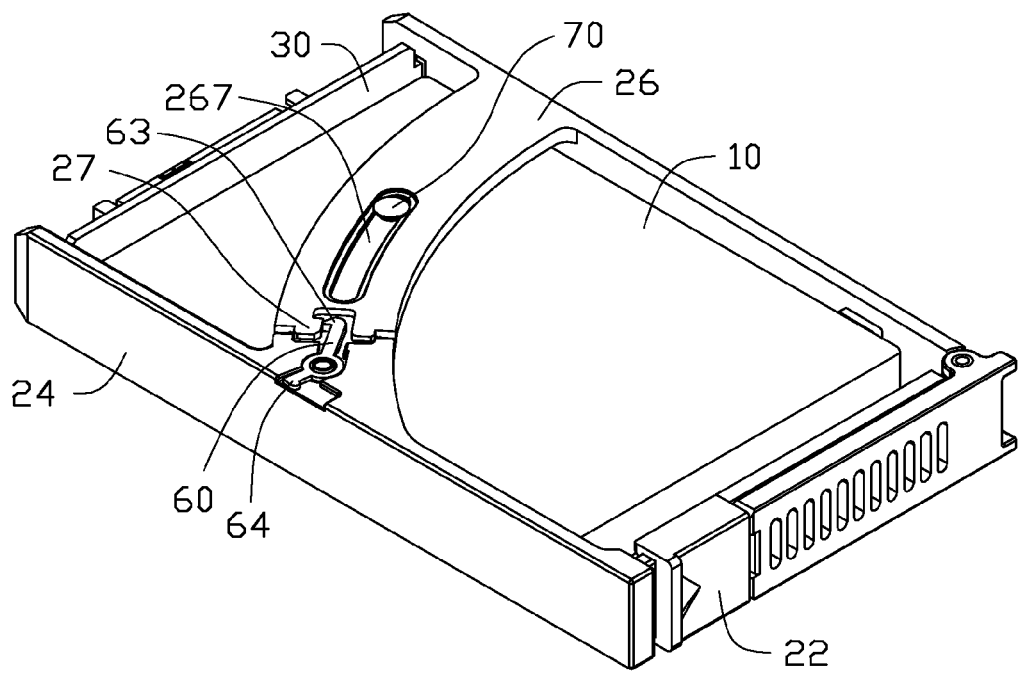
Figure 4:
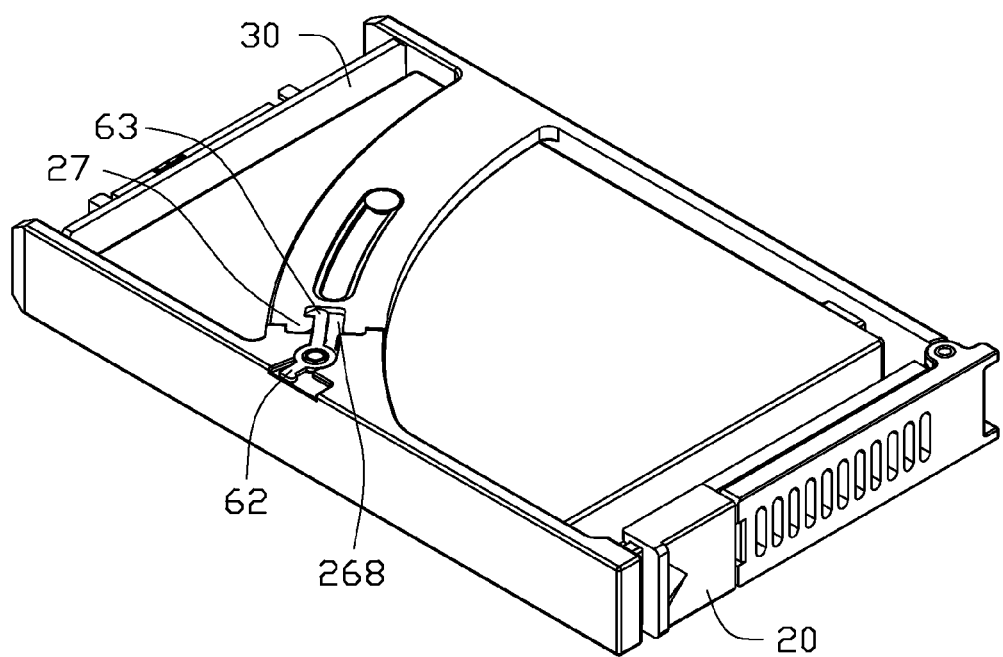

Referring to FIGS. 2 to 4, in assembly, the tabs 263 of the second clamping arm 26 are placed between two corresponding adjacent tabs 202 of the front plate 22. The pivot holes 265 are aligned with the pivot holes 204. The shaft 40 extends though the pivot holes 265 and 204 to rotatably mount the second clamping arm 26 to the front plate 22. The torsion spring 50 is received in the receiving space 247. Two opposite ends of the torsion spring 50 resist against two opposite inner walls of the receiving space 247. The latching member 60 is received in the receiving space 247 and is positioned on the torsion spring 50. A first one of the locking pins 70 extends through the through hole 249 of the first clamping arm 24 and the torsion spring 50 engages in the pivot hole 62. Thus, the latching member 60 is rotatably mounted to the latching piece 246. A second one of the locking pins 70 extends through the slide slot 267 of the second clamping arm 26 to be locked in the mounting hole 243 of the latching piece 246.

The date storage device 10 with the circuit board 30 is mounted to the first clamping arm 22. The first mounting pins 244 of the first clamping arm 22 are engaged in the corresponding mounting holes 120. The first latches 34 are latched in the corresponding mounting holes 241. The second clamping arm 26 is rotated toward the first clamping arm 24. The slide plate 266 slides along the latching piece 246. The second one of the locking pins 70 slides in the slide slot 267. The slanting surface 261 resists against the second hook 63 to rotate the latching member 60 about the first one of the locking pins 70, until the second hook 63 is latched in the latching slot 268 and is engaged with the first hook 27. The engaging block 269 and the first hook 27 resist against the blocking surface 245. The second mounting pins 264 are engaged in the corresponding mounting holes 120. The second tab 36 is latched in the mounting hole 260.

In disassembly, the handle 64 is operated to rotate the latching member 60, thereby disengaging the second hook 63 from the first hook 27. The second clamping arm 26 is rotated to move away from the first clamping arm 24. The second mounting pins 264 and the second tab 36 are moved out from the corresponding mounting holes 120 and 260. Therefore, the data storage device 10 with the circuit board 30 is easily detached from the first clamping arm 24.

It is believed that the present embodiment and its advantages will be understood from the foregoing description, and it will be apparent that various changes may be made thereto without departing from the spirit and scope of the description or sacrificing all of their material advantages, the examples hereinbefore described merely being exemplary embodiments.

What is claimed is:

1. A mounting apparatus for mounting a data storage device, the mounting apparatus comprising:
   a bracket comprising a first clamping arm, and a second clamping arm pivotable relative to the first clamping arm, wherein a mounting pin extends from each of the first and second clamping arms, and the second clamping arm comprises a first hook;
   a locking member pivotably mounted to the first clamping arm and comprising a second hook; and
   a latching member;
   wherein when the second clamping arm is pivoted towards the first clamping arm, the first hook of the second clamping arm drives the locking member to rotate until the second hook engages with the first hook and the mounting pins engage in opposite sidewalls of the data storage device;
   wherein the first clamping arm comprises an arc-shaped latching piece extending from a center of a top of the first clamping arm, and a positioning portion extending from the latching piece, the positioning portion defines a receiving space, the latching member is pivotably received in the receiving space, and the latching member comprises a handle opposite to the second hook, to be operated to pivot the latching member.

2. The mounting apparatus of claim 1, wherein a torsion spring is received in the receiving space under the latching member, two opposite ends of the torsion spring resist against two opposite inner walls of the receiving space.

3. The mounting apparatus of claim 2, wherein the second clamping arm comprises a slide plate extending from a center of a top of the second clamping arm, the slide plate defines an arc-shaped slide slot, the latching piece defines a mounting hole, a locking pin slidably extends through the slide slot to be locked in the mounting hole of the latching piece.

4. The mounting apparatus of claim 3, wherein an extremity of the slide plate defines a latching slot, the first hook extends from the extremity and at a first side of the latching slot, and comprises a slanting surface opposite to the second clamping arm, wherein when the slide plate slides along the latch piece, the slanting surface resists against the second hook to force the latching member to rotate until the second hook is latched to the first hook.

5. The mounting apparatus of claim 4, wherein the positioning portion comprises a blocking surface, away from the first clamping arm, to resist against the extremity of the slide plate.

6. The mounting apparatus of claim 1, wherein the bracket comprises a front plate, the first clamping arm is fixed to a first end of the front plate, and the second clamping arm is pivotably mounted to a second end of the front plate opposite to the first end.

7. The mounting apparatus of claim 6, wherein a plurality of cushions extends from each of the first and second clamping arms for absorbing vibrations between the data storage device and the first and second clamping arms.

8. The mounting apparatus of claim 7, wherein the latching piece defines a mounting hole, the second clamping arm comprises a slide plate extending from a center of a top of the second clamping arm, the slide plate defines an arc-shaped slide slot, a locking pin slidably extends through the slide slot to be locked in the mounting hole of the latching piece.

9. The mounting apparatus of claim 8, wherein the receiving space pivotably receives a torsion spring and the latching member, the torsion spring is located under the latching member, two opposite ends of the torsion spring resist against two opposite inner walls of the receiving space.

10. The mounting apparatus of claim 1, further comprising a circuit board, mounted to a rear end of the data storage device, wherein two first latches extending from a first end of the circuit board, and a second latch extending from a second end of the circuit board opposite to the first end, the first clamping arm defines two mounting holes to latch the first latches, the second clamping arm defines a mounting hole to latch the second latch.

11. A mounting apparatus for mounting a data storage device, the mounting apparatus comprising:
   a bracket comprising a first clamping arm, and a second clamping arm pivotable relative to the first clamping arm, wherein a mounting pin extends from each of the first and second clamping arms, and the second clamping arm comprises a first hook;
   a locking member pivotably mounted to the first clamping arm and comprising a second hook; and
   a latching member;
   wherein when the second clamping arm is pivoted towards the first clamping arm, the first hook of the second clamping arm drives the locking member to rotate until the second hook engages with the first hook and the mounting pins engage in opposite sidewalls of the data storage device;
   wherein the bracket comprises a front plate, the first clamping arm is fixed to a first end of the front plate, and the second clamping arm is pivotably mounted to a second end of the front plate opposite to the first end;
   wherein a plurality of cushions extends from each of the first and second clamping arms for absorbing vibrations between the data storage device and the first and second clamping arms;
   wherein the first clamping arm comprises an arc-shaped latching piece extending from a center of a top of the first clamping arm, the latching piece defines a mounting hole, the second clamping arm comprises a slide plate extending from a center of a top of the second clamping arm, the slide plate defines an arc-shaped slide slot, a locking pin slidably extends through the slide slot to be locked in the mounting hole of the latching piece; and
   wherein the first clamping arm further comprises a positioning portion extending from the latching piece, the positioning portion defines a receiving space to pivotably receive a torsion spring and the latching member, the torsion spring is located under the latching member, two opposite ends of the torsion spring resist against two opposite inner walls of the receiving space.

* * * * *